United States Patent
Hordos

(10) Patent No.: US 9,027,965 B2
(45) Date of Patent: May 12, 2015

(54) GAS GENERATOR

(75) Inventor: Deborah L. Hordos, Troy, MI (US)

(73) Assignee: TK Holdings Inc., Armada, MI (US)

( * ) Notice: Subject to any disclaimer, the term of this patent is extended or adjusted under 35 U.S.C. 154(b) by 1642 days.

(21) Appl. No.: 11/604,628

(22) Filed: Nov. 27, 2006

(65) Prior Publication Data

US 2007/0120351 A1    May 31, 2007

Related U.S. Application Data

(60) Provisional application No. 60/740,001, filed on Nov. 25, 2005.

(51) Int. Cl.
*B60R 22/46* (2006.01)
*B60R 22/195* (2006.01)

(52) U.S. Cl.
CPC ......... *B60R 22/4628* (2013.01); *B60R 22/1954* (2013.01)

(58) Field of Classification Search
USPC ........ 280/741, 806; 422/165–167; 149/108.4, 149/108.6, 109.2, 109.4, 109.6; 60/632; 297/480
See application file for complete search history.

(56) References Cited

U.S. PATENT DOCUMENTS

| | | | |
|---|---|---|---|
| 3,715,131 A * | 2/1973 | Hurley et al. | 280/736 |
| 5,872,329 A | 2/1999 | Burns et al. | 149/36 |
| 5,879,631 A | 3/1999 | Wewers et al. | 422/98 |
| 5,975,570 A * | 11/1999 | Bosio | 280/741 |
| 6,251,200 B1 * | 6/2001 | Dunne | 149/108.4 |
| 6,513,834 B1 * | 2/2003 | Blomquist | 280/741 |
| 6,708,914 B2 | 3/2004 | Stevens | 242/374 |
| 2005/0116454 A1 * | 6/2005 | Stevens et al. | 280/741 |

FOREIGN PATENT DOCUMENTS

EP    1457759 A1    9/2004

OTHER PUBLICATIONS

Office Action U.S. Appl. No. 12/002,701, filed Dec. 17, 2007, Mailed Sep. 27, 2010.
Office Action U.S. Appl. No. 11/479,493, filed Jun. 30, 2006, Mailed Sep. 30, 2010.
Office Action U.S. Appl. No. 12/217,327, filed Jul. 2, 2008, Mailed Nov. 10, 2010.

* cited by examiner

*Primary Examiner* — Paul N Dickson
*Assistant Examiner* — Timothy Wilhelm
(74) *Attorney, Agent, or Firm* — L.C. Begin & Associates, PLLC.

(57) ABSTRACT

A gas generating system (24) is provided including a gas generant container (34) and an initiator (28). A gas generant composition (32) is placed within the container (34) in ignitable communication with the igniter (28). A molecular sieve (33) is positioned within the housing 17 combined within the gas generant composition (32), or external of the gas generant (32) but in reactive proximity or vapor communication therewith. A seatbelt device (150) and a vehicle occupant restraint system (180) incorporating a gas generating system as described herein are also disclosed.

12 Claims, 3 Drawing Sheets

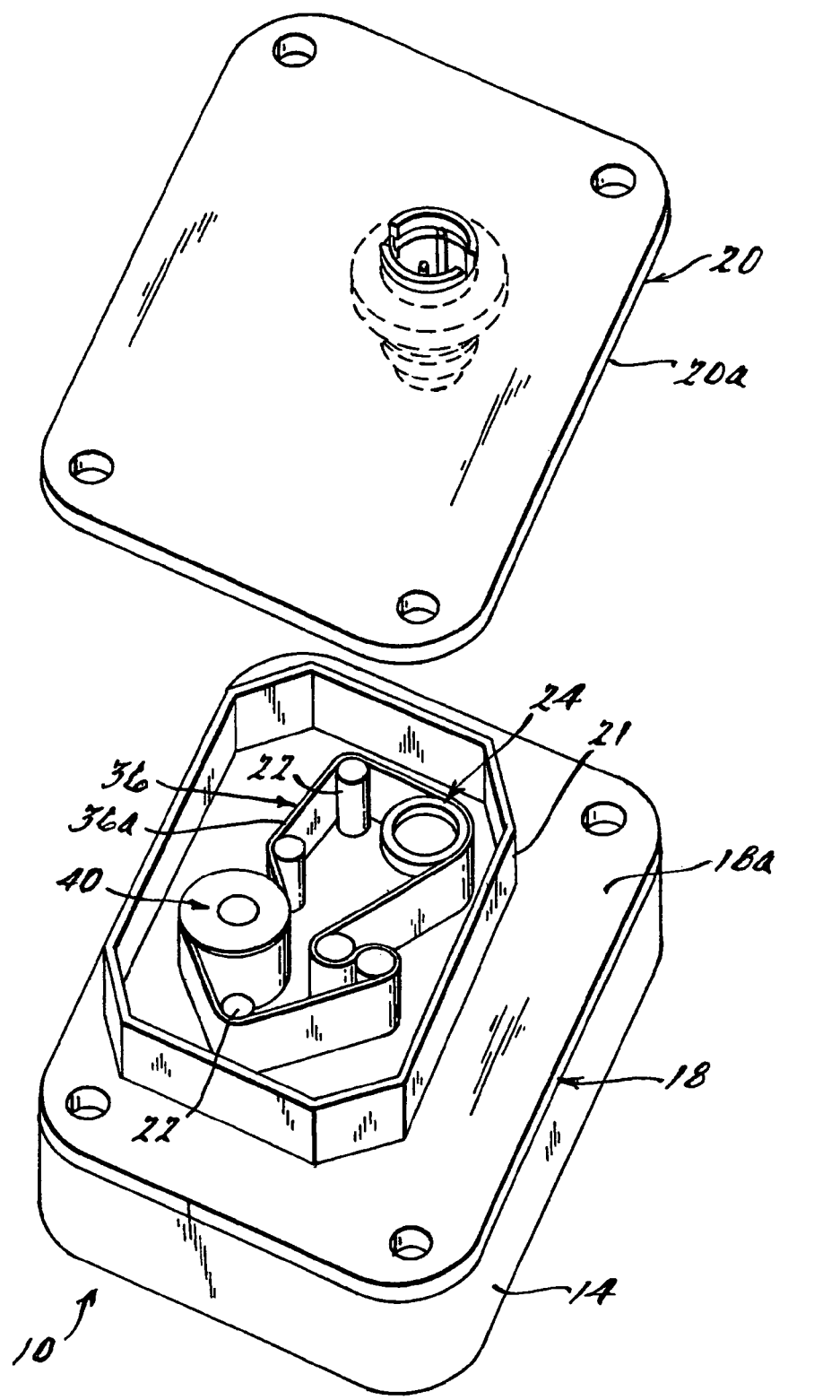

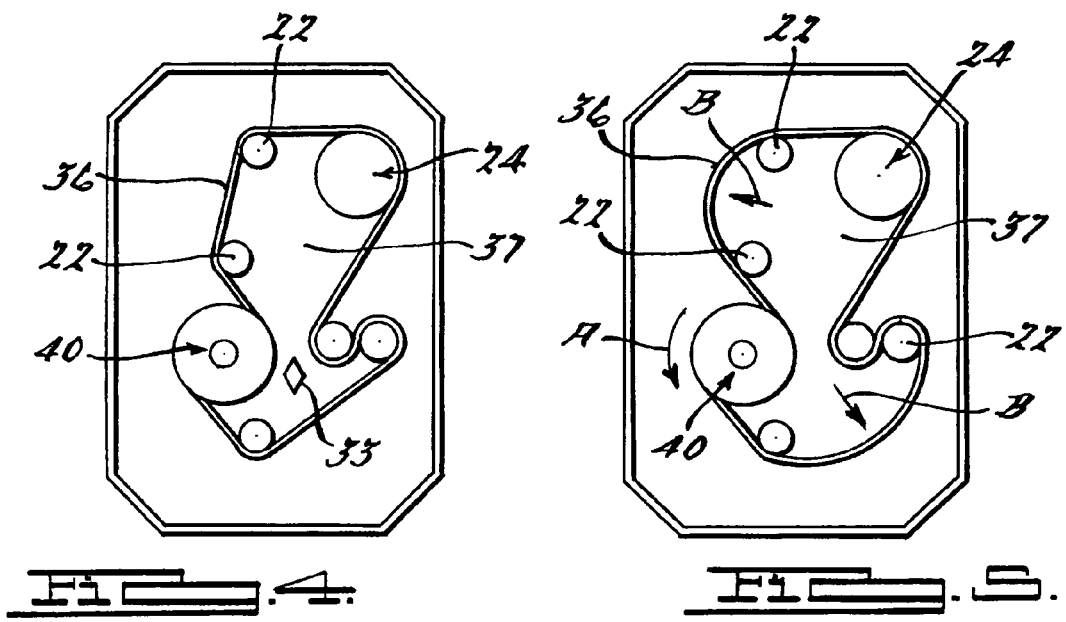
FIG. 4.
FIG. 5.
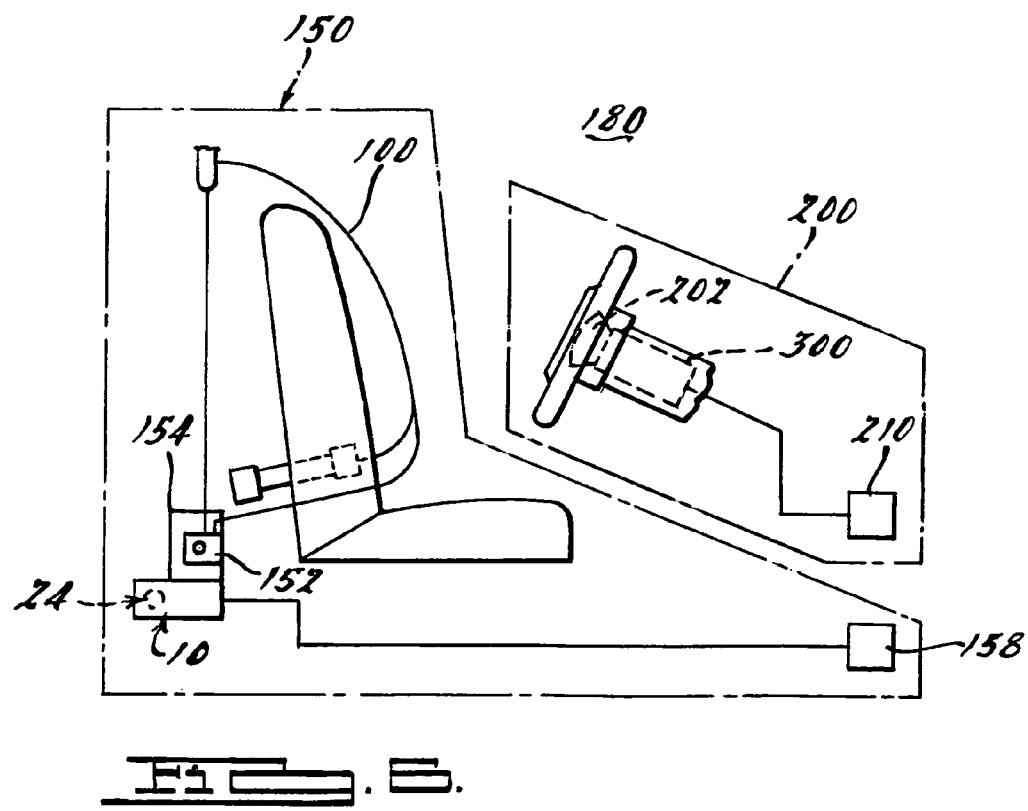
FIG. 6.

GAS GENERATOR

CROSS REFERENCE TO RELATED APPLICATIONS

This application claims the benefit of provisional application Ser. No. 60/740,001, filed on Nov. 25, 2005.

BACKGROUND OF THE INVENTION

The present invention relates generally to gas generating systems and, more particularly, to gas generators used in vehicle occupant protection systems and related components, such as seatbelt pretensioners.

Gas generators used in seatbelt pretensioners are known as micro gas generators due to the relatively small size of the gas generator. Exemplary pretensioners using such micro gas generators include those described in U.S. Pat. Nos. 6,460,794, 6,505,790, 6,520,443, and 6,419,177, incorporated herein by reference. Micro gas generators generally contain an initiator including an initiator charge, a header or initiator holder in which the initiator is received and secured therein, and a gas generant composition which ignites and burns in response to ignition of the initiator to produce gases for actuating the seatbelt pretensioner.

The gas generant composition must be positioned so as to enable ignition thereof by the initiator upon activation of the micro gas generator. In typical micro gas generator designs, a casing containing the gas generant composition is hermetically attached to the initiator holder, with the gas generant composition in direct fluid communication with a casing containing the initiator charge. Upon activation of the initiator, by-products from initiator charge combustion fracture or otherwise penetrate the initiator charge casing, igniting the gas generant. However, the need to provide features enabling hermetic attachment of the gas generant casing to the initiator holder complicates the design of the holder. For example, crimp tabs or flanges formed in the holder for accommodating fasteners for casing attachment, as well as grooves and surfaces formed along the holder to accommodate compliant seals for hermetically encapsulating the gas generant, increase the complexity and cost of fabricating the initiator holder. Furthermore, the provision of sealing elements (for example, O-rings or other gaskets) increases the assembly part count, and the cost and time associated with manufacturing the assembly.

Yet another challenge with gas generant compositions that produce relatively small amounts of solids, sometimes known as "smokeless" compositions, is that not all non-metallic constituents contribute to stable ballistic performance when subjected to environmental conditioning. In fact, one fuel that is favored because of its propensity to produce all or mostly gas is nitrocellulose and derivatives thereof When combined with other gas generant constituents such as an oxidizer, and formed into a gas generant composition, this fuel contributes to greater amounts of gas upon combustion of the composition. It is nevertheless believed that nitrocellulose may contribute to an unacceptably aggressive ballistic performance as measured after thermal cycling and thermal shock testing defined in SAE International Document SAE/USCAR-24 "USCAR INFLATOR TECHNICAL REQUIREMENTS AND VALIDATION", herein incorporated by reference.

SUMMARY OF THE INVENTION

A gas generating system is provided including a gas generant container and an initiator. The initiator is positioned exterior of the gas generant container so as to enable fluid communication with the container upon activation of the initiator. A gas generant composition is hermetically sealed in an interior of the container. The gas generant container has sufficient rigidity to maintain a predetermined shape prior to positioning of the gas generant therein, and is penetrable by combustion products resulting from activation of the initiator.

A gas generating system of the present invention also includes a molecular sieve for filtering of undesirable gases in the combustion effluent, the molecular sieve being integrated within an associated gas generating composition, or separate or spaced apart from the gas generating composition but in vapor communication therewith, and within the same assembly such as a seatbelt pretensioner. By including a molecular sieve within the system housing, gas generants such as nitrocellulose may be employed due to an enhanced capacity to sustain acceptable performance after USCAR heat aging requirements.

BRIEF DESCRIPTION OF THE DRAWINGS

FIG. 2 is a perspective view of the pretensioner shown in FIG. 1;

FIG. 4 is a cross-sectional plan view of the pretensioner of FIG. 1 showing the arrangement of the strap prior to pretensioner activation;

FIG. 5 is the view of FIG. 4 showing the extension of the strap after pretensioner activation; and FIG. 6 is a schematic representation of an exemplary vehicle occupant restraint system including a micro gas generator incorporating molecular sieve in accordance with the present invention.

DETAILED DESCRIPTION

Figure 1:
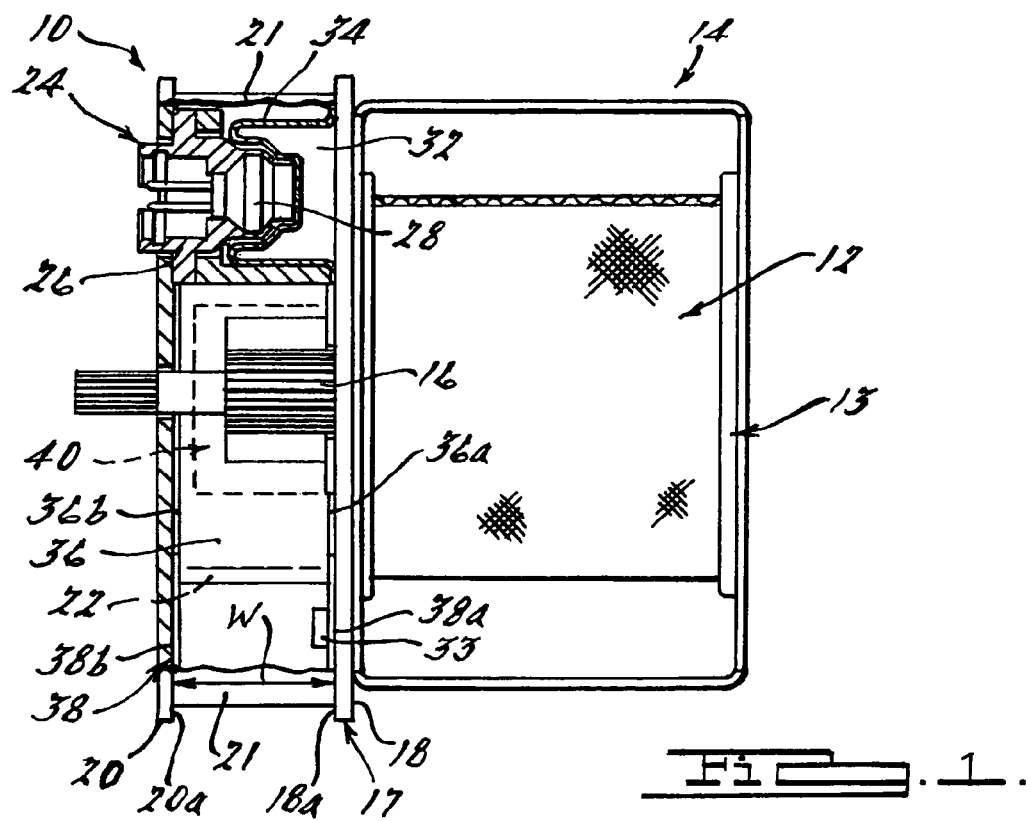
FIG. 1 is a cross-sectional side view of a pretensioner incorporating a gas generator in accordance with the present invention.

Referring to FIGS. 1 and 2, a pyrotechnic pretensioner 10 in accordance with one embodiment of the invention is employed to pretension a seat belt 12 wound about a reel 13 of a conventional seat belt retractor 14. "Pretensioning" is generally defined as taking up slack in the seat belt in the event of sudden deceleration or collision. A webbing reel retractor shaft 16 extends from retractor 14 into pretensioner 10 and thereby cooperates with the pretensioner 10 to tighten the seatbelt 12 in the event of an accident. The pretensioner of the present invention has generic application, for example only, in seatbelt assemblies having seatbelt retractors as described in U.S. Pat. Nos. 4,558,832 and 4,597,546, incorporated herein by reference.

Referring to FIGS. 1 and 2, pretensioner 10 includes a housing 17 having a first plate 18 and a second plate 20 spaced apart from the first plate. The region between plates 18 and 20 defines an interior of the housing. In one embodiment, a plurality of spacers 22 is secured between first plate 18 and second plate 20 to secure the plates in position relative to one another, thereby providing and maintaining the spacing between the plates. Separation between plates 18 and 20 is also (or alternatively) provided by an outer wall 21 extending between the plates and substantially along the outer edges of the plates to enclose the components of the pretensioner described below. Plates 18 and 20 have opposed respective interior faces 18a and 20a. Faces 18a and 20a are substantially flat.

Spacers 22 each have a pair of opposite end portions with each end portion being secured to a respective one of first plate 18 or second plate 20 using one of a variety of known methods, such as welding, fasteners, adhesives, etc. Spacers 22 are positioned within housing 17 to serve as guides around which a strap 36 (described below) is wound. Also, in one embodiment, spacers 22 have substantially equal lengths to provide a substantially equal separation distance between plates 18 and 20 along the extent of interior faces 18a and 20a. Plates 18, 20 and spacers 22 are formed from steel, aluminum, metal alloys, plastic, and/or other known materials suitable for the applications described herein.

Figure 3:
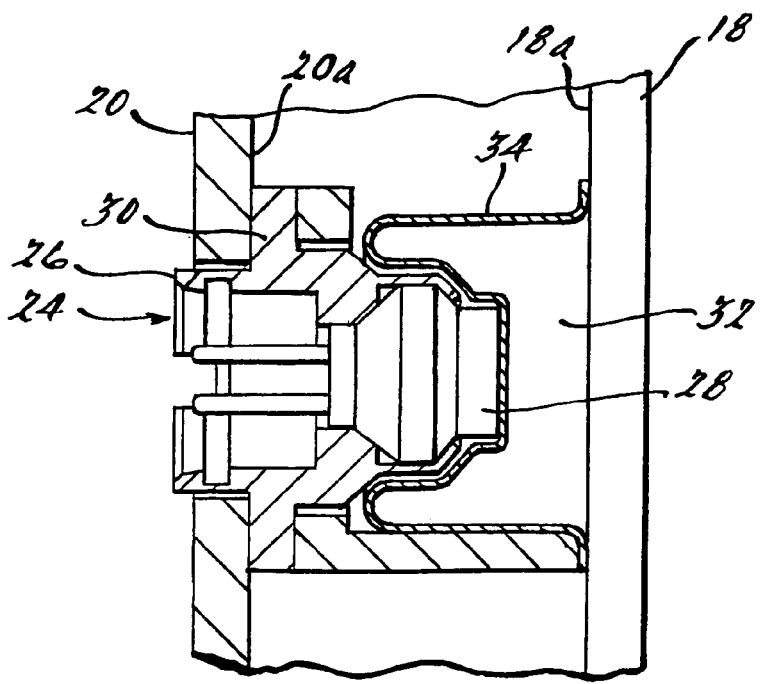
FIG. 3 is a cross-sectional side view of a gas generator in accordance with the present invention.

Referring to FIG. 3, a gas generating system 24 is positioned in the interior of the housing for generating inflation gas used to activate pretensioner 10. Gas generating system 24 includes an initiator assembly 26 comprising a header or initiator holder 30, and an initiator 28 secured in header 30.

On example of an initiator suitable for use in the present invention is described in U.S. Pat. No. 6,009,809, incorporated herein by reference. Initiator 28 may be secured in header 30 using any one of several known methods, such as crimping, welding, press-fitting, molding, or the application of adhesives or fasteners. Alternatively, initiator 28 may be secured within a portion of the pretensioner assembly without the use of a holder, using one or more of the methods set forth above.

Header 30 is also secured to one of first plate 18 or second plate 20 using any one of several known methods, such as crimping, welding, press-fitting, or the application of adhesives or fasteners. Header 30 may be formed form a metal, a metal alloy, or a polymeric material.

In one embodiment, a gas generant composition 32 is positioned within housing 17, between first plate 18 and second plate 20 in a location that enables fluid communication with initiator 28 upon activation of the initiator. Gas generant compositions suitable for use in the gas generator of the present invention include nitrocellulose, compounds containing a mixture of nitroguanadine, potassium perchlorate and cellulose acetate butyrate, compounds containing a mixture of epoxy and potassium perchlorate, and compounds containing a mixture of epoxy, silicone, and potassium perchlorate. These compositions exemplify, but do not limit, useful gas generant compositions.

In the embodiment shown in FIG. 3, a container 34 is provided for enclosing and positioning gas generant composition 32 in relation to initiator 28. In one embodiment, the container 34 is in the form of a cup formed from aluminum, a metal alloy, a polymer material, or any other material that is formable into the shape required for the cup and frangible, meltable, or otherwise penetrable when exposed to the pressure and/or heat and/or other by-products of combustion of the initiator charge. Cup 34 is hermetically sealed and positioned and secured relative to initiator 28 so as to enable fluid communication between the cup and initiator charge combustion products upon activation of the initiator. In the embodiment shown in FIG. 1-5, cup 34 welded or otherwise attached to one plates 18, 20 adjacent to or abutting initiator 28 so as to be fracturable by initiator 28, to expose gas generant 32 to ignition products, thereby igniting the gas generant. Alternatively, cup 34 may be positioned spaced apart from the initiator and secured to any suitable component of the pretensioner assembly.

Cup 34 may be hermetically sealed by positioning the gas generant composition 32 therein and affixing portions of the cup to the housing or other portion of the pretensioner assembly. Alternatively, the gas generant may be positioned within the cup and the cup hermetically sealed to form a separate sub-assembly prior to attachment to the pretensioner assembly. Storing the gas generant in a hermetically sealed cup detached from, but positioned proximate, the initiator assembly obviates the need to attach and hermetically seal the gas generant to the initiator assembly itself, thereby simplifying the design of the initiator assembly.

In an alternative embodiment, the gas generant composition is hermetically sealed within a separate packet (for example, a polymer bag) which is positioned within frangible cup 34. Cup 34 is then attached to the pretensioner assembly so as to enable fluid communication between the cup and initiator charge combustion products upon activation of the initiator. This enables a predetermined quantity of gas generant to be easily positioned and secured in a fixed location with respect to the initiator, while obviating the need to hermetically seal cup 34 during assembly. As explained below, in this embodiment molecular sieve 33 is mixed within the gas generant composition to obviate the effects of any moisture retention during the manufacture and assembly of the gas generator.

Referring again to FIGS. 1 and 2, a strap 36 has opposite end portions wrapped around and secured to a portion of a clutch assembly 40 (described below), a body 36a extending between the end portions, and a pair of opposed lateral edges 36b, and 36c. Strap body 36a has a width W between lateral edges 36b and 36c dimensioned to provide a slight clearance fit with first plate 18 and second plate 20, along strap lateral edges 36b and 36c. Body 36a extends from clutch assembly 40 to wrap around spacers 22 and micro gas generator 24, thereby defining an enclosure, generally designated 37 (FIG. 4), bounded by first and second plates 18, 20 and by strap body 36a. Strap 36 is preferably made from steel or some other hard and ductile metal or alloy. Strap 36 may be cut from steel sheet metal, for example. In a manner described below, strap 36 acts as a medium for transferring forces produced by expansion of inflation gases to a clutch assembly (described below), thereby actuating the pretensioner.

Referring again to FIG. 1, a seal 38 is provided for maintaining inflation gases within chamber 37 during extension of strap 36 and the resulting expansion of the chamber. In one embodiment, seal 38 is a compliant foil seal, one example of which is manufactured by Mohawk Innovative Technology, Inc., of Albany, N.Y. The compliant foil seal includes a smooth, compliant foil 38a supported by an elastic strip 38b designed to provide spatially variable stiffness and damping support for foil 38a. The foil and support strip are affixed to interior face 18a of first plate 18, and to interior face 20a of second plate 20. Principles of construction of foil seals usable in the pretensioner of the present invention are described in U.S. Pat. Nos. 6,505,837, 5,833,369, and 5,902,049, all incorporated herein by reference. Other embodiments of the foil seal and alternative types of seals suitable for substantially maintaining inflation gases within chamber 37 are also contemplated for use in the pretensioner described herein.

A clutch assembly, generally designated 40, is provided for coupling strap 36 to retractor shaft 16 upon activation of the pretensioner and extension of strap 36. As used herein, the term "clutch assembly" is meant to apply generically to any clutch component or combination of components that are useful in the seatbelt retractor and pretensioner art. Stated another way, a "clutch assembly" is any component or combination of components that exert a rotary force on the retractor shaft 16 and thus produce a pretensioning or tightening of belt 12 by winding the associated webbing reel 13. In general, a portion of clutch assembly 40 has ends of strap 36 secured thereto and is spring-loaded so that slack is substantially removed from the strap prior to activation of the pretensioner.

Many such assemblies are known in the art. For example, U.S. Pat. Nos. 5,743,480, 6,419,177 and 5,222,994, incorporated herein by reference, describe a few of the known clutch assemblies suitable for use with the pretensioner of the present invention.

Components of clutch assembly 40 may be die cast from aluminum, steel or suitable alloys thereof Alternatively, the components may be injection molded if plastic material is used. In a preferred embodiment, the clutch assembly components are formed from hard resilient plastic thereby reducing the weight of pretensioner 10.

In yet another aspect of the invention, gas generators for use in a vehicle occupant protection system, including seatbelt pretensioners, airbag inflators, head curtain inflators, and other gas generators may include nitrocellulose as a gas generant composition. The use of nitrocellulose contradicts typical understanding of the compatibility of the compound relative to USCAR heat stability requirements requiring aging at 400 hours at 107 degrees Celsius. It has been found that including molecular sieves 33 within the gas generant, thereby traps detrimental radicals that accelerate the decomposition of nitrocellulose and therefore permits the use of the compound as a gas generant., or at least as a gas generant constituent. The molecular sieves may be employed, for example, at sizes of 3A, 4A, 5A, 10A, and/or 13X in powder, pellet, and/or spherical shapes. When combined with molecular sieves in a gas generant composition, nitrocellulose could be employed as an autoignition, booster, and/or primary gas generant composition(s) in applications where the generation of gas is desired. Alternatively, molecular sieves could as described herein, be positioned in vapor communication with the gas generant composition but not necessarily mixed therein.

Molecular sieves integrated with nitrocellulose or other fuels in a gas generant composition, may be purchased from known suppliers such as DELTA ADSORBENTS, or, SHANGHAI HENGYE CHEMICAL CO., LTD. of China, both accessed over the world wide web. The molecular sieve is iteratively added to any gas generant formulation containing nitrocellulose and analyzed for heat stability over time as per U.S. CAR requirements for example. The amount necessary for any given application may be determined in this manner.

In further accordance with the present invention, the molecular sieve 33 is provided within the housing 17. If desired, the molecular sieves 33 may be integrated within the gas generant composition, or may be positioned within the housing 17 in vapor communication with the gas generant. Either approach may be interpreted as being in "operable communication" with the gas generating composition. Accordingly, as shown in the Figures, the molecular sieve 33 may be positioned within the housing 17, external of the gas generator 24, to thereby react with the combustion effluent exiting the gas generating system 24. As a result, it is believed that nitrocellulose decomposition is inhibited thereby ensuring compliance with USCAR heat aging requirements. The molecular sieve 33 may be positioned wherever operable within the housing 17, and accordingly, although effective, the molecular sieve 33 does not limit the design permutations that may be considered for placement of the initiator 28, for example.

The molecular sieve 33 is typically provided in a quantity or molar amount sufficient adsorb or absorb any decomposition products formed within the gas generator. As such, the total amount of molecular sieve 33 employed may, for example, be determined by iteratively evaluating the amount of gas generant employed, and heat aging compositions containing molecular sieves, or compositions having molecular sieves in vapor communication therewith. The heat aging is done in compliance with USCAR heat aging requirements at about 400 hours and 107 C. This may be determined on an iterative basis depending on the amount and type of gas generant employed (nitrocellulose for example), and on the type of gas generant system 24 or assembly that the system 24 is employed within. Thermal stability is then determined by Differential Scanning Calorimeter (DSC) technology, as known in the art. It has been found that molecular sieve may be employed as mixed within the gas generating composition at about 1 to 100%, and more preferably at about 10-100%, of the weight of the gas generating composition, or more. Accordingly, a gas generant weighing 100 grams might contain about 5-100 grams of molecular sieve either mixed within the gas generant in a known manner, or, the molecular sieve might be employed within the gas generator in vapor communication with the gas generant but not mixed therein.

TABLE 1

| Aging Specification | Sample | % Sample Weight Loss | Comments |
|---|---|---|---|
| 432 Hours @ 107 C. | Control Nitrocellulose (NC) | | Self Ignited in Oven |
| | NC + 5A | 4.68 | |
| | NC + 13X | 0.00 | |
| | NC + CaO-5A | −0.97 | Weight gain due to CO2 adsorption |
| | Vented IMR sample (107 C.) | 17.77 | |
| | IMR + 13X (107 C.) | 1.14 | |
| 432 Hours @ 90 C. | Control Nitrocellulose (NC) | 9.0 | |
| | NC + 5A | 0.06 | |
| | NC + 13X | 0.05 | |
| | NC + CaO-5A | −0.95 | Weight gain due to CO2 adsorption |
| | Vented IMR sample (90 C.) | 2.28 | |
| | MR + 13X (90 C.) | 0.19 | |
| 507 Hours @ 107 C. | 65% NC/35% KP 13X vapor communication | 0.0 | 190 DSC exotherm |
| | NC/KP(10% w/w 13x blend) | 1.0 | 190 DSC exotherm |
| | 60% NC/40% SN 13X vapor communication | 0.0 | 182 DSC exotherm |
| | NC/SN(10% w/w 13x blend) | 1.4 | 181 DSC exotherm |

Note:
IMR samples were air dried for 24 hours before using. Molecular sieve to sample ratio = 1.1 for vapor scavenging (vapor communication). IMR is a trade name for NC smokeless powder, commercially stabilized and provided by the IMR Powder Company of Pittsburgh, N.Y. 5A and 13X are types of molecular sieve.

As shown in Table 1, the use of nitrocellulose results in self ignition in the oven during heat aging for 400 hours at 107 C, illustrating the thermal instability of nitrocellulose. Adding molecular sieve 5A or 13X resulted in minimal or negligible weight loss after heat aging, illustrating enhanced thermal stability. The use of calcium oxide and SA molecular sieve resulted in adsorption of carbon dioxide during heat aging. It will be appreciated that although calcium oxide has a desiccating function, it also adsorbs carbon dioxide and over time, the adsorption of environmental carbon dioxide has been found to lead to fracture and crumbling of the associated gas generating composition. Gas generating compositions containing nitrocellulose and oxidizers such as potassium perchlorate or strontium nitrate, in operable communication with molecular sieve, resulted in acceptable autoignition exotherms as determined by DSC; minimal weight loss occurred after heat aging at 107 C for 507 hours.

In accordance with the present invention, the following examples further illustrate the effect of molecular sieve when operably communicating with gas generating compositions containing nitrocellulose and an oxidizer component.

EXAMPLE 1

A composition containing blended nitrocellulose, potassium perchlorate and molecular sieve 13X was aged for at least 400 hours at 107 C in accordance with USCAR requirements. The same composition prior to aging was also evaluated for autoignition exothermic behavior. As determined by DSC, the aged and unaged compositions presented exotherms at 193.14 C and 190.32 C, respectively, indicating thermal stability, and essentially little or no effect due to heat aging.

EXAMPLE 2

A composition containing nitrocellulose and potassium perchlorate was aged for at least 400 hours at 107 C in accordance with USCAR requirements. Molecular sieve 13X was positioned proximate the composition during heat aging, in a 1:1 weight percent ratio, and in vapor communication therewith. As determined by DSC, the composition presented an exotherm at 190.72 C, indicating thermal stability.

A second composition containing blended nitrocellulose, potassium perchlorate, and molecular sieve 13X was also aged for at least 400 hours at 107 C. As determined by DSC, the composition presented an exotherm at 189.87 C, indicating thermal stability.

EXAMPLE 3

A composition containing nitrocellulose and potassium perchlorate was evaluated by DSC wherein an autoignition exotherm of 196.73 resulted.

A composition containing nitrocellulose and potassium perchlorate was aged for at least 400 hours at 107 C in accordance with USCAR requirements. Molecular sieve 13X was positioned proximate the composition during heat aging, in a 1:1 weight percent ratio, and in vapor communication therewith. As determined by DSC, the composition presented an exotherm at 190.07 C, indicating thermal stability.

The same composition containing blended nitrocellulose, potassium perchlorate, and molecular sieve 13X was also aged in the same way. As determined by DSC, the composition presented an exotherm at 193.14 C, indicating thermal stability, and essentially little or no effect due to heat aging.

The lower autoignition exothermic temperatures of the aged compositions indicate an autoignition shift thereby increasing the autoignition functionality of the respective compositions.

EXAMPLE 4

A composition containing nitrocellulose and strontium nitrate was aged for at least 400 hours at 107 C in accordance with USCAR requirements. Molecular sieve 13X was positioned proximate the composition during heat aging, in a 1:1 weight percent ratio, and in vapor communication therewith. As determined by DSC, the composition presented an exotherm at 190.72 C, indicating thermal stability.

A second composition containing blended nitrocellulose, strontium nitrate, and molecular sieve 13X was also aged for at least 400 hours at 107 C. As determined by DSC, the composition presented an. autoignition exotherm at 189.87 C, indicating thermal stability.

EXAMPLE 5

A composition containing blended nitrocellulose and strontium nitrate was evaluated by DSC wherein an autoignition exotherm of 195.06 resulted.

A composition containing blended nitrocellulose, strontium nitrate, and molecular sieve 13X was aged for at least 400 hours at 107 C in accordance with USCAR requirements. As determined by DSC, the composition presented an autoignition exotherm at 180.96 C, indicating thermal stability and also indicating an autoignition shift thereby enhancing the autoignition functionality of this composition. The results of this example and that of Example 3 indicates that autoignition functionality is in general increased when molecular sieve is added or provided in operable communication with the gas generating composition.

Prior to activation and as shown in FIGS. 4 and 5, pretensioner 10 is operatively disengaged from retractor shaft 16 so as not to interfere with normal operation (i.e., seatbelt unwinding and rewinding) of the retractor. In operation, electrical contacts on initiator 28 communicate with a sensor that signals actuation of pretensioner 10. Upon operation of the gas generating system 24, when initiator 28 receives a signal, from an accelerometer for example, the initiator charge contained in initiator 28 ignites, fracturing or otherwise penetrating the wall of cup 34 containing gas generant composition 32, igniting the gas generant. The gas pressure from combustion of gas generant 32 produces tension forces acting along strap 36, causing a corresponding extension of the strap and resulting in expansion of chamber 37 in the directions indicated by arrows B. As chamber 37 expands, tension on strap 36 forces end portions of strap 36 attached to clutch assembly 40 to pull on the clutch assembly, resulting in a sudden rotation of the portion of the assembly attached to strap 36, in the direction indicated by arrow A. This sudden rotation activates the clutch assembly, causing it to engage retractor shaft 16 and forcing the retractor shaft to rotate in the direction indicated by arrow A, thereby pretensioning the safety belt. In one embodiment of the compliant foil seal previously described, a thin, high pressure gas film is formed between each of strap lateral edges 36b, 36c and a foil surface 38a positioned along a corresponding adjacent interior face of one of plates 18 and 20 during expansion of the inflation gas and the resulting extension of strap 36. This thin gas film separates the foil surface from the lateral edge of strap 36, enabling non-contact movement of strap 36 along plate interior surfaces 18a and 20a and inhibiting leakage of inflation gases between the foil 38a and strap 36. Relative positions of spacers along interior faces 18a and 20a may be determined as required to channel or guide expansion of the strap into desired portions of the housing interior (for example, in cases where the size envelope occupied by housing 17 is restricted to a certain size or configuration).

Referring to FIG. 5, in a particular application, a micro gas generator 24 as described herein is incorporated into a safety belt pretensioner 10 employed in a safety belt assembly 150 used in a vehicle occupant restraint system 180. Safety belt assembly 150 includes a safety belt housing 152 and a safety belt 100 extending from housing 152. A safety belt retractor mechanism 154 (for example, a spring-loaded mechanism) may be coupled to an end portion of the belt. Safety belt pretensioner 10 may be coupled to belt retractor mechanism 154 to actuate the retractor mechanism in the event of a collision. Micro gas generator 24 is adapted to actuate seat belt retractor mechanism 154 to pretension safety belt 160. Typical seat belt retractor mechanisms which may be used in conjunction with safety belt 160 are described in U.S. Pat. Nos. 5,743,480, 5,553,803, 5,667,161, 5,451,008, 4,558,832 and 4,597,546, incorporated herein by reference. Safety belt assembly 150 may be in communication with a known crash event sensor 158 (for example, an inertia sensor or an accelerometer) that is in operative communication with a known crash sensor algorithm (not shown) which signals actuation of belt pretensioner 10 via, for example, activation of initiator 28 (not shown in FIG. 5) in micro gas generator 24. U.S. Pat. Nos. 6,505,790 and 6,419,177 provide illustrative examples of pretensioners actuated in such a manner.

Referring again to FIG. 5, vehicle occupant restraint system 180 may also include additional elements such as an airbag system 200. Stated another way, vehicle occupant protection system 180 may contain one or more gas generating devices containing a molecular sieve 33, and containing an initiator 28 positioned in operable proximity to a gas generant container within the gas generator. In the embodiment shown in FIG. 5, airbag system 200 includes at least one airbag 202 and an inflator 300 coupled to airbag 202 so as to enable fluid communication with an interior of the airbag. Airbag system 200 may also include (or be in communication with) a crash event sensor 210. Crash event sensor 210 includes a known crash sensor algorithm that signals actuation of airbag system 200 via, for example, activation of airbag inflator 300 in the event of a collision.

It should be appreciated that safety belt assembly 150, airbag system 200, and more broadly, vehicle occupant protection system 180 exemplify but do not limit gas generating systems contemplated in accordance with the present invention.

Embodiments of the micro gas generator described herein may also have application in other elements typically employed in vehicle occupant protection systems. A vehicle occupant protection system may be defined to include at least one of the following: a device such as an airbelt, a buckle pretensioner, and/or a pyrotechnic actuator. Embodiments of the micro gas generator described herein may also be used, for example, with an airbelt (as exemplified in U.S. Pat. No. 6,685,220, incorporated herein by reference); with a buckle pretensioner (as exemplified in published U.S. Pat. No. 6,460,935, incorporated herein by reference); with a piston-based pyrotechnic actuator (as exemplified in U.S. Pat. No. 6,568,184, incorporated herein by reference), or with any other device incorporating a micro gas generator of the present invention within a vehicle occupant protection system. Additionally, the vehicle occupant protection system may also include, in addition to the device(s) containing the micro gas generator, other device(s) typically employed in vehicle occupant protection systems, such as an airbag system 200 as described above.

Unless otherwise noted, elements of the gas generators, pretensioners, and gas generating systems described herein may be manufactured using methods known in the art. In addition, a gas generator as described herein may be incorporated into any of a wide variety of alternative pretensioner designs. In addition, the embodiments of the gas generator described herein are not limited to use in seatbelt pretensioners, but may also be used in other applications. It will also be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
a pyrotechnic gas generator for production of gas; and
a gas generating composition contained within said pyrotechnic gas generator; and
molecular sieve in operable communication with said gas generating composition wherein said molecular sieve is provided in an amount at least 1% by weight of the gas generating composition and said molecular sieve is mixed within the gas generating composition.

2. The gas generating system of claim 1 wherein said molecular sieve is positioned within said gas generator but separate from said gas generating composition.

3. The gas generating system of claim 1 wherein said gas generating system is a seatbelt pretensioner, and said gas generator and molecular sieve are contained within the seatbelt pretensioner.

4. The gas generating system of claim 1 wherein said gas generator contains a gas generant that produces carbon monoxide upon combustion thereof.

5. The gas generating system of claim 1 wherein said gas generator contains nitrocellulose as a gas generant.

6. The gas generating system of claim 1 wherein said molecular sieve is provided at greater than 1% by weight of the gas generating composition.

7. The vehicle occupant protection system of claim 1 wherein said gas generant composition further comprises an oxidizer selected from the group consisting of strontium nitrate and potassium perchlorate.

8. The gas generating system of claim 1 included in a vehicle occupant protection system.

9. A gas generating device comprising:
a housing:
a pyrotechnic gas generator contained within said housing; and
a gas generating composition comprising nitrocellulose blended and mixed with molecular sieve, said composition contained within said pyrotechnic gas generator.

10. A seatbelt device containing a gas generating device as claimed in claim 9.

11. The vehicle occupant protection system of claim 9 wherein said gas generant composition further comprises an oxidizer selected from the group consisting of strontium nitrate and potassium perchlorate.

12. The gas generating device of claim 9 included in a vehicle occupant protection system.

\* \* \* \* \*

UNITED STATES PATENT AND TRADEMARK OFFICE
CERTIFICATE OF CORRECTION

| | |
|---|---|
| PATENT NO. | : 9,027,965 B2 |
| APPLICATION NO. | : 11/604628 |
| DATED | : May 12, 2015 |
| INVENTOR(S) | : Hordos |

Page 1 of 2

It is certified that error appears in the above-identified patent and that said Letters Patent is hereby corrected as shown below:

Title Page, below Abstract, delete "12 Claims, 3 Drawing Sheets" and insert -- 11 Claims, 3 Drawing Sheets --.

In the Specification:

| | |
|---|---|
| Column 1; Line 53; | Please insert --.-- after thereof. |
| Column 3; Line 30; | Please delete "form" and insert --from--. |
| Column 5; Line 7; | Please insert --.-- after thereof. |
| Column 5; Line 23; | Please delete "." after the first occurrence of generant. |
| Column 6; Line 38; | Please insert --I-- before MR. |
| Column 6; Line 56; | Please delete "SA" and insert --5A--. |
| Column 8; Line 1; | Please delete "." after an. |

In the Claims:

| | |
|---|---|
| Column 10; Line 22; | Delete Claim 2 and Lines 25-57, renumber claims 3-12 to Claims 2-11 as shown on attached page. |

Signed and Sealed this
Twenty-seventh Day of October, 2015

Michelle K. Lee
*Director of the United States Patent and Trademark Office*

2. The gas generating system of claim 1 wherein said gas generating system is a seatbelt pretensioner, and said gas generator and molecular sieve are contained within the seatbelt pretensioner.

3. The gas generating system of claim 1 wherein said gas generator contains a gas generant that produces carbon monoxide upon combustion thereof.

4. The gas generating system of claim 1 wherein said gas generator contains nitrocellulose as a gas generant.

5. The gas generating system of claim 1 wherein said molecular sieve is provided at greater than 1% by weight of the gas generating composition.

6. The vehicle occupant protection system of claim 1 wherein said gas generant composition further comprises an oxidizer selected from the group consisting of strontium nitrate and potassium perchlorate.

7. The gas generating system of claim 1 included in a vehicle occupant protection system.

8. A gas generating device comprising:
a housing:
a pyrotechnic gas generator contained within said housing; and
a gas generating composition comprising nitrocellulose blended and mixed with molecular sieve, said composition contained within said pyrotechnic gas generator.

9. A seatbelt device containing a gas generating device as claimed in claim 8.

10. The vehicle occupant protection system of claim 8 wherein said gas generant composition further comprises an oxidizer selected from the group consisting of strontium nitrate and potassium perchlorate.

11. The gas generating device of claim 8 included in a vehicle occupant protection system.